(12) United States Patent
Daniel et al.

(10) Patent No.: US 7,509,413 B2
(45) Date of Patent: Mar. 24, 2009

(54) TOOL FOR DISPLAYING JMX MONITORING INFORMATION

(75) Inventors: Brent H. Daniel, Morrisville, NC (US); Michael P. Etgen, Cary, NC (US); Christopher C. Mitchell, Raleigh, NC (US); David N. Brauneis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/721,819

(22) Filed: Nov. 24, 2003

(65) Prior Publication Data

US 2005/0125719 A1    Jun. 9, 2005

(51) Int. Cl.
   *G06F 15/00*      (2006.01)
   *G06F 17/00*      (2006.01)

(52) U.S. Cl. .................. 709/224; 709/202; 714/4; 714/47; 714/48; 714/57; 715/513; 715/760

(58) Field of Classification Search .......... 709/202, 709/203, 224; 714/11, 24, 25; 707/3–6
   See application file for complete search history.

(56) References Cited

U.S. PATENT DOCUMENTS

| | | | |
|---|---|---|---|
| 6,009,265 A | 12/1999 | Huang et al. | |
| 6,032,193 A | 2/2000 | Sullivan | |
| 6,591,266 B1 | 7/2003 | Li et al. | |
| 7,152,185 B2 * | 12/2006 | Srivastava et al. | 714/24 |
| 2002/0073232 A1 | 6/2002 | Hong et al. | |
| 2002/0083039 A1 | 6/2002 | Ferrari et al. | |
| 2002/0083188 A1 | 6/2002 | Hericy et al. | |
| 2002/0091753 A1 * | 7/2002 | Reddy et al. | 709/202 |
| 2003/0004669 A1 * | 1/2003 | Gorman | 702/117 |
| 2003/0037048 A1 | 2/2003 | Kabra et al. | |
| 2003/0120768 A1 | 6/2003 | Simpson | |
| 2005/0125719 A1 | 6/2005 | Daniel et al. | 715/513 |

FOREIGN PATENT DOCUMENTS

| | | |
|---|---|---|
| CN | 02111251.7 | 10/2003 |
| JP | 2002-189642 | 5/2002 |

OTHER PUBLICATIONS

Sun Microsystems, "Java Management Extensions Instrumentation and Agent Specification," Sun Microsystems, Santa Clara, CA, Oct. 2002, vol. 1.2.

"Java Management Extensions Instrumentation and Agent Specification, v1.2," Sun Microsystems, Inc., Maintenance Release, Oct. 2002.

* cited by examiner

*Primary Examiner*—Jude J Jean Gilles
(74) *Attorney, Agent, or Firm*—Duke W. Yee; Bruce Clay; Rudolf O. Siegesmund

(57) ABSTRACT

A method, system and computer program product are provided to allow the status of components obtained through JMX queries to be loaded asynchronously in web content such that the status value of each component is displayed as soon as it becomes available, without having to wait for the completion of any other query.

3 Claims, 4 Drawing Sheets

TOOL FOR DISPLAYING JMX MONITORING INFORMATION

TECHNICAL FIELD

The present invention relates generally to monitoring the status of components in a J2EE environment and, in particular, to improving the efficiency with which status information is obtained and displayed.

BACKGROUND ART

Java Management Extensions (JMX) application programming interface (API) provides a means for asynchronously determining the status of system components (such as servers, applications, processes or other resources) in a Java Enterprise Edition (J2EE) server. The status monitoring API requires a user to perform complex queries in order to obtain the status and consequently, it is advantageous to provide a simple client which allows a user to visualize the status of large groups of components. Such a client may consist of a web page containing a series of images corresponding to the states of the various components.

JMX queries are executed asynchronously and may not be completed within any specific period of time. However, the content of a web page typically loads and displays serially. Thus, a JMX query may not begin until the previous query has been completed. Because some queries may take a long time to complete while other may take only a short time, a single, long-running query may block the completion and display of other, shorter queries.

FIG. 1 is a block diagram of a prior art process 100 of monitoring the status of components. A user at a client device, such as a web-based administrative console 102, initiates JMX queries to determine the status of several server components 110 and 120. For clarity, only two components are illustrated; many more may be included in the system and the queries. The queries are first transmitted to a servlet 104 which processes the first query 106 to determine the status of the first server 110. The first server 110 responds after which the servlet 104 processes the second query 108 to determine the status of the second server 120. Only when the responses from all of the servers has been received by the servlet 104 does the servlet 104 provide them to the browser running in the client 102.

Moreover, the user may be interested in only a subset of the objects for which the status is presented or may be interested in information other than status, such as a simple list of application servers. If there are ten such servers and each JMX query takes up to three minutes to complete, the user may have to wait for as long as thirty minutes to see the results, even though the specific information desired by the user may be available almost immediately.

Consequently, a need remains for improving the efficiency with which monitoring information is provided to a user.

SUMMARY OF THE INVENTION

The present invention provides method, system and computer program product to allow the status of components obtained through JMX queries to be loaded asynchronously in web content such that the status value of each component is displayed as soon as it becomes available, without having to wait for the completion of any other query.

DETAILED DESCRIPTION OF THE PREFERRED EMBODIMENT

Figure 1:
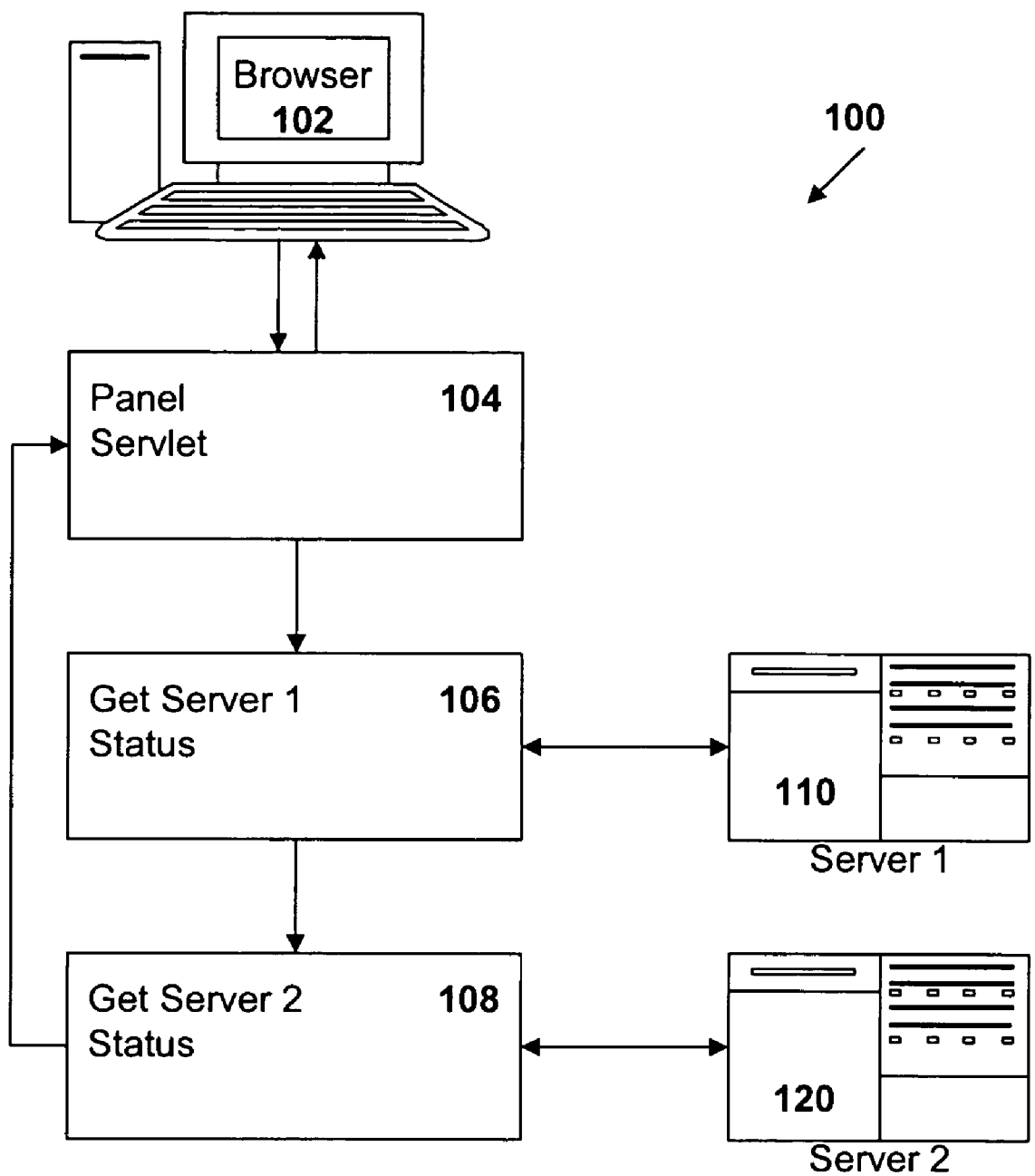
FIG. 1 is a block diagram of a prior art component monitoring system.
Figure 2:
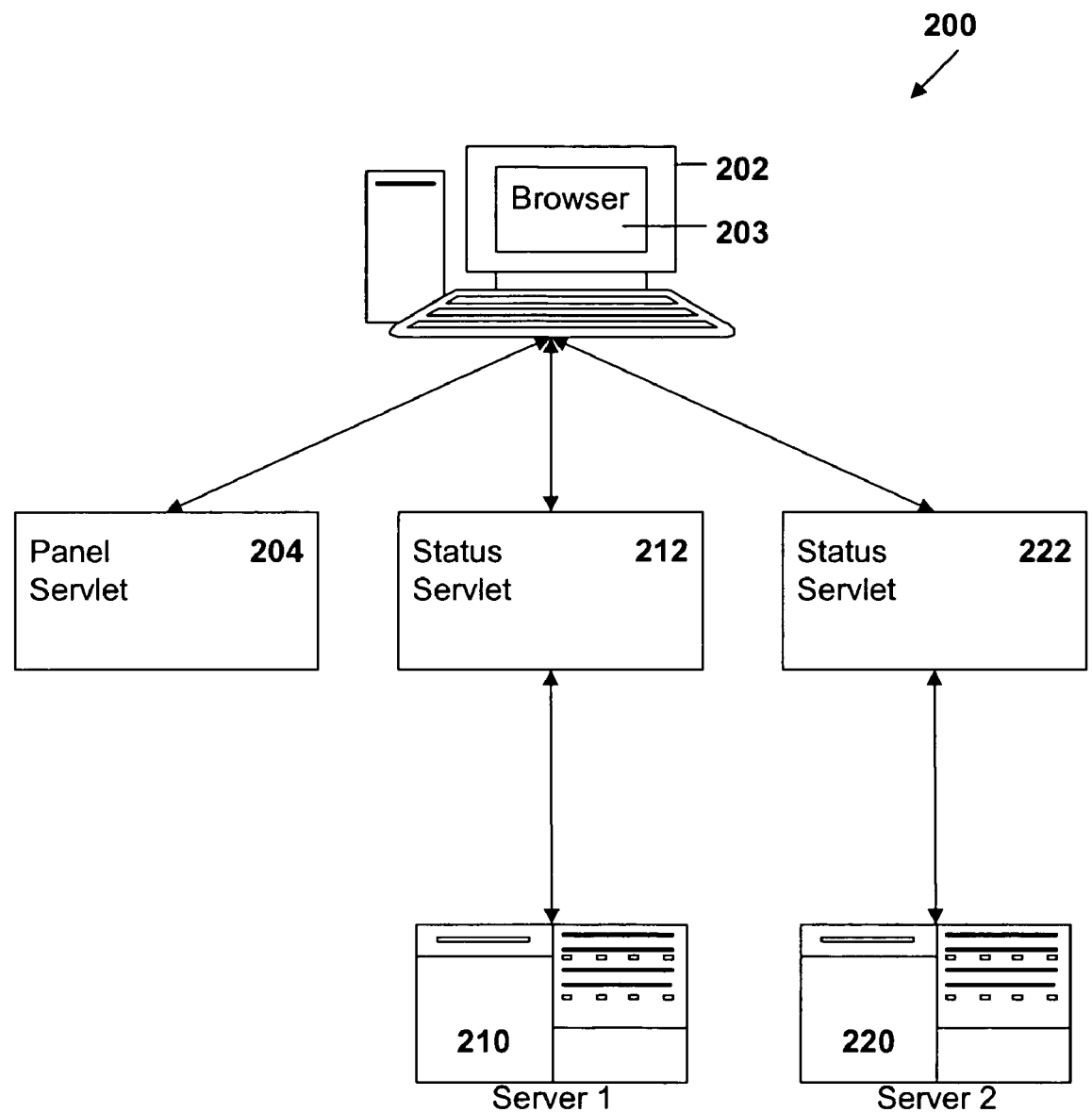
FIG. 2 is a block diagram of a component monitoring system of the present invention.
Figure 3:
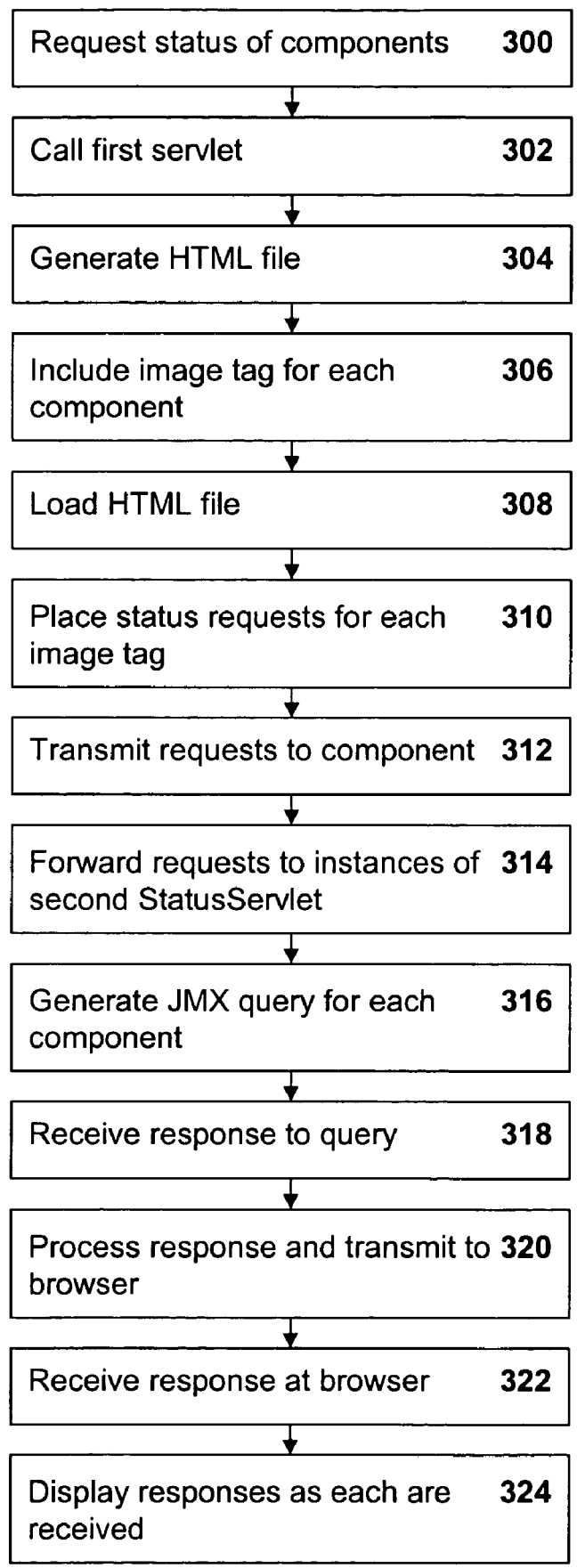
FIG. 3 is a flow chart of the component monitoring system of the present invention.

FIG. 2 is a block diagram of a component monitoring system 200 of the present invention. The system 200 includes a web-based administrative console 202 running a web browser 203. And As before, only two components 210 and 220 are shown although more may be included. Referring also to the flow chart of FIG. 3, a user at the console 202 requests a web page containing the status of any number of objects or components, such as the servers 210 and 220 (step 300). The status may include whether the component is stopped, started, in error, etc. The user may also request other information pertaining to the components 210 and 220. A servlet 204 is called (step 302) to dynamically generate an HTML file (step 304) which ultimately will be used to display the status information on the console 202. Although in the prior system illustrated in FIG. 1 a servlet 104 would determine each component's status and include in the HTML file an image corresponding to the status, in the present invention 200 the servlet 204 instead includes an image tag (step 306) which points to another servlet. Moreover, the image tag includes enough information to perform a JMX query of the corresponding component. For example, an exemplary image tag might comprise:

<image src="/servlet/StatusServlet?component=Server&name=MyServer"/> which calls a servlet named StatusServlet and returns an image representing the status of a component of type "Server" with the name "MyServer".

The web page defined by the HTML file is loaded by the browser 203 running in the console (step 308) and places status requests for each of the image tags (step 310). These requests are placed in parallel. The requests are transmitted to each server 210 and 220 (step 312) but processed by copies or instances of the second servlet 212 and 222 (step 314) (StatusServlet in the above example). Each instance of the servlet 212, 214 uses the information provided in the request and generates a JMX query on the corresponding server (step 316). After receiving a response to the query in the form of a value representing the status of the component (step 318), each servlet 212, 214 processes the response and transmits it to the browser 203 (step 320). The processed response includes an image corresponding to the value returned from the JMZ query. The processed response also preferably includes a directive to prevent the browser from caching the response.

Figure 4:
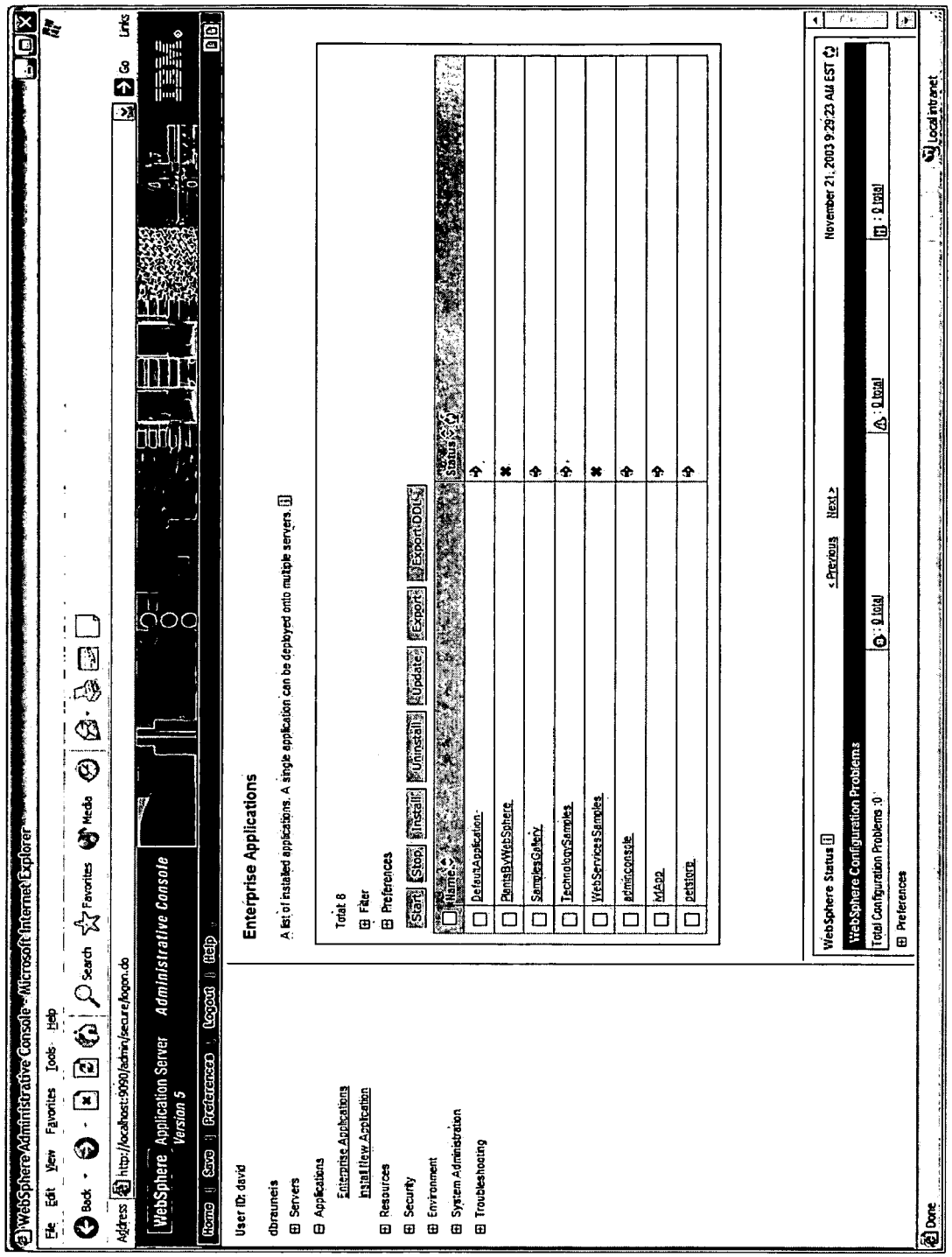
FIG. 4 is an exemplary screen shot of the display of component status information obtained with the present invention.

The browser 203 receives the response (step 322) which appears as a standard displayable image. As each response is received by the browser 203, it is displayed (step 324) for the user even if other queries are still being processed. Referring again to the original example, if there are ten components and each JMX query takes up to three minutes to complete, the user will only have to wait approximately three minutes to see results, a significant improvement over the prior sequential method. FIG. 4 illustrates an exemplary screen shot of a browser window displaying status information received for several resources.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for displaying JMX monitoring information, comprising:
receiving a request for a web page containing the status of a plurality of system components;
calling a first servlet operable to: generate a plurality of image tags, each corresponding to one of the components and pointing to an instance of a second servlet, each image tag comprising information to perform a JMX query; and
generate an HTML file comprising the plurality of image tags;
loading in a web browser the web page based on the HTML file;
transmitting requests to the instances of the second servlet substantially in parallel for images represented by each image tag; and
for each instance of the second servlet:
performing a JMX query based upon the information within the image tag;
receiving a response from the JMX query, the response including a value representative of the status of the corresponding component;
generating an image comprising the returned value;
transmitting the image to the browser; and
displaying the image;
wherein displaying the image of a returned value representing the status of a corresponding component is not dependent upon the display of the image of a returned value representing the status of any other component.

2. A JMX status monitoring apparatus, comprising:
a client device;
a browser running on the client device;
a plurality of system components, each component having a current status;
a plurality of instances of a first servlet, each instance corresponding to one of the plurality of system components; and
a second servlet callable from the browser and programmed to:
generate a plurality of image tags, each corresponding to one of the plurality of components and pointing to an instance of a first servlet, each image tag comprising information to perform a JMX query; and
generate an HTML file comprising the plurality of image tags;
the browser programmed to:
load a web page based on the HTML file; and
transmit requests to the instances of the first servlet substantially in parallel for images represented by each image tag; and each instance of the first servlet programmed to:
perform a JMX query based upon the information within the image tag;
receive a response from the JMX query, the response including a value representative of the status of the corresponding component;
generate an image comprising the returned value;
transmit the image to the browser; and display the image;
wherein displaying the image of a returned value representing the status of a corresponding component is not dependent upon the display of the image of a returned value representing the status of any other component.

3. A computer program product stored in a computer readable storage medium usable with a programmable computer, the computer program product having computer-readable code embodied therein for displaying JMX monitoring information, the computer-readable code comprising instructions for:
receiving a request for a web page containing the status of a plurality of system components;
calling a first servlet operable to: generate a plurality of image tags, each corresponding to one of the components and pointing to an instance of a second servlet, each image tag comprising information to perform a JMX query; and
generate an HTML file comprising the plurality of image tags;
loading in a web browser the web page based on the HTML file;
transmitting requests to the instances of the second servlet substantially in parallel for images represented by each image tag; and
for each instance of the second servlet:
performing a JMX query based upon the information within the image tag;
receiving a response from the JMX query, the response including a value representative of the status of the corresponding component;
generating an image comprising the returned value;
transmitting the image to the browser; and
displaying the image;
wherein displaying the image of a returned value representing the status of a corresponding component is not dependent upon the display of the image of a returned value representing the status of any other component.

* * * * *